(12) United States Patent
Chen

(10) Patent No.: US 8,788,610 B2
(45) Date of Patent: Jul. 22, 2014

(54) COMMUNICATION CIRCUIT AND METHOD UTILIZING A SINGLE COMMUNICATION LINE

(75) Inventor: Wei Chen, Saratoga, CA (US)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 121 days.

(21) Appl. No.: 13/370,454

(22) Filed: Feb. 10, 2012

(65) Prior Publication Data

US 2012/0209936 A1    Aug. 16, 2012

(30) Foreign Application Priority Data

Feb. 15, 2011    (CN) .......................... 2011 1 0038381

(51) Int. Cl.
| | |
|---|---|
| G06F 15/16 | (2006.01) |
| H04L 5/14 | (2006.01) |
| G06F 1/26 | (2006.01) |
| H04L 25/49 | (2006.01) |
| H04L 25/02 | (2006.01) |

(52) U.S. Cl.
CPC .............. *H04L 5/1415* (2013.01); *G06F 1/266* (2013.01); *H04L 25/0276* (2013.01); *H04L 25/4902* (2013.01)
USPC ........................................................ 709/208

(58) Field of Classification Search
CPC ............ H04L 25/4902; H04L 25/0276; H04L 5/1415
USPC ........................................................ 709/208
See application file for complete search history.

(56) References Cited

U.S. PATENT DOCUMENTS

| | | | | |
|---|---|---|---|---|
| 4,174,534 A | * | 11/1979 | Kotlarewsky | ................... 363/26 |
| 4,176,392 A | * | 11/1979 | Cronin et al. | ................... 363/71 |
| 5,931,902 A | * | 8/1999 | Shindoh et al. | ............... 709/213 |
| 7,259,474 B2 | * | 8/2007 | Blanc | ............................. 307/45 |
| 7,804,350 B1 | | 9/2010 | Edmondson et al. | |
| 8,558,524 B2 | * | 10/2013 | Carroll et al. | ................. 323/272 |
| 8,680,884 B2 | * | 3/2014 | Chobot | .................... 324/764.01 |
| 2009/0108677 A1 | * | 4/2009 | Walter et al. | .................... 307/80 |
| 2011/0280299 A1 | * | 11/2011 | O'Malley et al. | ............. 375/238 |

FOREIGN PATENT DOCUMENTS

CN            101742180 A    6/2010

* cited by examiner

*Primary Examiner* — Kevin Bates
*Assistant Examiner* — Nazia Naoreen
(74) *Attorney, Agent, or Firm* — Michael C. Stephens, Jr.

(57) ABSTRACT

The present invention relates to a communication circuit and method utilizing a single communication line. In one embodiment, a communication circuit can include: a host apparatus having a host sub-circuit and a host port; and a slave apparatus having a slave sub-circuit and a slave port, where the host and slave apparatuses are coupled by the host and slave ports via the single communication line, when the slave apparatus is in a normal working condition, the host sub-circuit receives a first controlling signal, and generates an output controlling signal for the slave sub-circuit, which generates a second controlling signal, when the slave apparatus is in an abnormal working condition, the slave sub-circuit receives a first feedback signal, and generates a feedback controlling signal for the host apparatus, and generates a second feedback signal that regulates the first controlling signal such that the slave apparatus recovers to the normal working condition.

18 Claims, 9 Drawing Sheets

US 8,788,610 B2

COMMUNICATION CIRCUIT AND METHOD UTILIZING A SINGLE COMMUNICATION LINE

RELATED APPLICATIONS

This application claims the benefit of Chinese Patent Application No. CN201110038381.9, filed on Feb. 15, 2011, which is incorporated herein by reference in its entirety.

FIELD OF THE INVENTION

The present invention generally pertains to the field of electronics, and more particularly to a communication circuit and method for a power supply.

BACKGROUND

A conventional communication system may include a host apparatus and a slave apparatus, both of which have an output port to output signals and an input port to input signals. This arrangement is configured to achieve a bi-directional transference of both transmitting and receiving signals. During operation, the host apparatus may output a certain signal through an output port, and the slave apparatus may operate based on the received signal through the slave input port. In addition, the host apparatus may operate based on a received feedback signal that is transferred to the host input port for indicating status information associated with the slave apparatus to regulate output signal.

For power integrated circuits (ICs), both output port to output controlling signal (e.g., pulse-width modulation [PWM] controlling signal, etc.) and input port to receive feedback signal may be necessary when using such communication schemes. This can result in increased quantity of communication ports, as well as associated costs.

SUMMARY

In view of the above-mentioned limitations, particular embodiments may provide a communication circuit configured for power ICs, and utilizing a single communication line.

In one embodiment, a communication circuit can include: (i) a host apparatus having a host sub-circuit and a host port; and (ii) a slave apparatus having a slave sub-circuit and a slave port, where the host apparatus and the slave apparatus are coupled by the host port and the slave port via a single communication line, (iii) when the slave apparatus is in a normal working condition, the host sub-circuit receives a first controlling signal, and generates an output controlling signal that is sent to the slave apparatus through the host port, and the slave sub-circuit receives the output controlling signal through the slave port, and generates a second controlling signal, and (iv) when the slave apparatus is in an abnormal working condition, the slave sub-circuit receives a first feedback signal, and generates a feedback controlling signal that is sent to the host apparatus through the slave port, and the host apparatus receives the feedback controlling signal through the host port, and generates a second feedback signal that regulates the first controlling signal such that the slave apparatus recovers to the normal working condition.

In one embodiment, a communication method can include: (i) determining if a communication system is in a normal working condition, where the communication system comprises a host apparatus with a host port and a slave apparatus with a slave port, where the host apparatus and the slave apparatus are coupled by the host port and the slave port via a single communication line; (ii) when the communication system is in a normal working condition, converting a first controlling signal to an output controlling signal that is sent to the slave port through the host port; (iii) converting, by the slave apparatus, the output controlling signal to a second controlling signal; (iv) when the communication system is in an abnormal working condition, generating, by the slave apparatus, a first feedback signal indicating the abnormal working condition; (v) converting, by the slave apparatus, the first feedback signal to a feedback controlling signal that is sent to the host port through the slave port; and (vi) generating, by the host apparatus, a second feedback signal for regulating the first controlling signal such that the communication system recovers to the normal working condition.

Embodiments of the present invention can advantageously provide several advantages over conventional approaches. For example, bi-directional communication between a host apparatus and a slave apparatus by using a signal communication line (e.g., having associated input and output ports) can be provided, in order to overcome problems of higher cost and increased communication ports. Other advantages of the present invention will become readily apparent from the detailed description of preferred embodiments below.

DETAILED DESCRIPTION

Figure 1A:
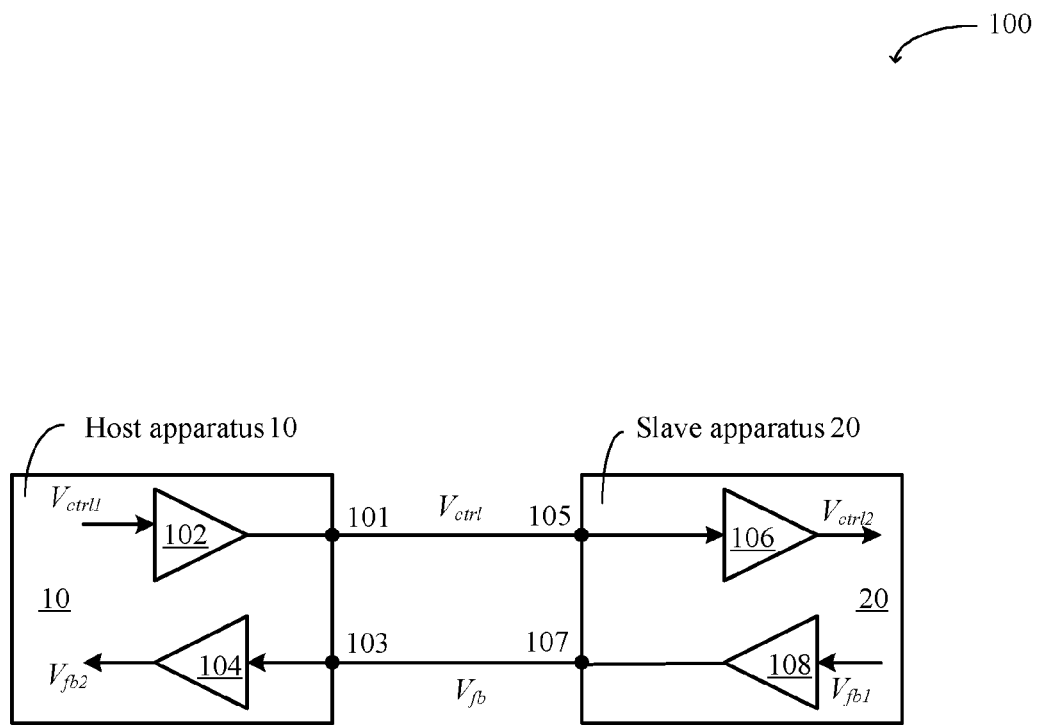
FIG. 1A is a schematic diagram of an example communication circuit.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide several advantages over conventional approaches. For example, bi-directional communication between a host apparatus and a slave apparatus by using a signal communication line (e.g., having associated input and output ports) can be provided, in order to overcome problems of higher cost and increased communication ports. The invention, in its various aspects, will be explained in greater detail below with regard to exemplary embodiments.

With reference to FIG. 1A, shown is an example communication system 100 with host apparatus 10 and slave apparatus 20. Here, host apparatus 10 can include output port 101, input port 103, controlling signal generator 102 coupled to output port 101, and feedback signal receiver 104 coupled to input port 103. Slave apparatus 20 can include input port 105, an output port 107, controlling signal receiver 106 coupled to input port 105, and feedback signal generator 108 coupled to output port 107.

When communication system 100 is in a normal working condition, first controlling signal $V_{ctrl1}$ of host apparatus 10 may be converted into an output controlling signal $V_{ctrl}$ by controlling signal generator 102. Then, second controlling signal $V_{ctrl2}$ may be generated based on the output controlling signal, which may be transferred or sent to input port 105 of slave apparatus 20 through output port 101 to control the operation of an associated or following circuit.

When the communication system 100 is in an abnormal working condition, first feedback signal $V_{fb1}$ may be generated indicating the abnormal working condition by slave apparatus 20. Feedback signal generator 108 can receive the first feedback signal to generate feedback controlling signal $V_{fb}$, which may then be transferred to input port 103 of host apparatus 10 through output port 107. Second feedback signal $V_{fb2}$ may be generated based on the received feedback controlling signal $V_{fb}$ by feedback signal receiver 104 to regulate first controlling signal $V_{ctrl1}$.

In this approach, two ports for each of host apparatus and slave apparatus are utilized to receive and transmit controlling signal and feedback signal information separately, and to maintain the communication system in a normal working condition, which can increase the overall cost of the communication system.

Power supply applications can include a pulse-with modulation (PWM) controller, power stage, and feedback circuit. A PWM controlling signal may be generated by the PWM controller in order to control the operation of the power stage to output an electronic signal (e.g., a regulated voltage $V_{out}$).

Figure 1B:
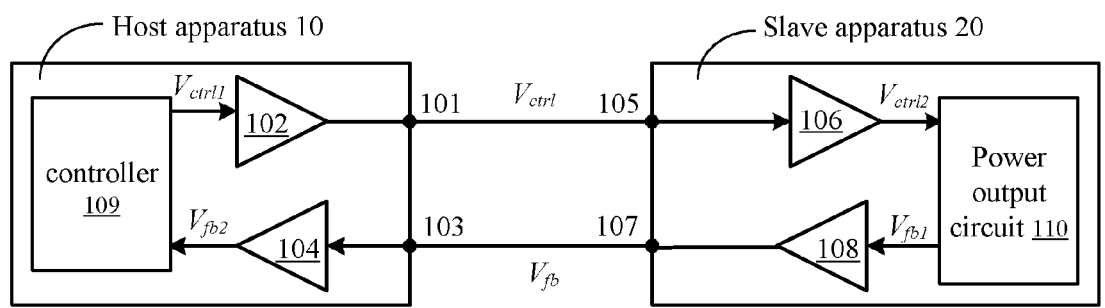
FIG. 1B is a schematic diagram of an example power supply employing the communication circuit of FIG. 1A.

With reference to FIG. 1B, a schematic diagram indicating an example transmission relationship between a controlling signal and a feedback signal for a power supply application is shown. First controlling signal $V_{ctrl1}$ may be generated by controller 109, and first feedback signal $V_{fb1}$ indicating a status of slave apparatus 20 may be generated by power output circuit 110.

When slave apparatus 20 is in a normal working condition, first controlling signal $V_{ctrl1}$ can be generated by controller 109 of host apparatus 10, which may be converted into output controlling signal $V_{ctrl}$ by controlling signal output sub-circuit 102, and then transferred to input port 105 of slave apparatus 20 through host output port 101. Output controlling signal may be converted into a second controlling signal $V_{ctrl2}$ by controlling signal receiving sub-circuit 106 to control the operation of power output circuit 110.

When slave apparatus 20 is in an abnormal working condition or operation, first feedback signal $V_{fb1}$ may be generated by power output circuit 110 of slave apparatus 20, which can be converted into a feedback controlling signal $V_{fb}$ by feedback signal output sub-circuit 108. The feedback controlling signal $V_{fb}$ may be transferred to input port 103 of host apparatus 10 through output port 107 of slave apparatus 20. A second feedback signal $V_{fb2}$ can be generated by feedback signal receiving sub-circuit 104 in accordance with the received feedback controlling signal $V_{fb}$, to regulate first controlling signal $V_{ctrl1}$ by controller 109.

For example, a communication circuit can include: (i) a host apparatus having a host sub-circuit and a host port; and (ii) a slave apparatus having a slave sub-circuit and a slave port, where the host apparatus and the slave apparatus are coupled by the host port and the slave port via a single communication line, (iii) when the slave apparatus is in a normal working condition, the host sub-circuit receives a first controlling signal, and generates an output controlling signal that is sent to the slave apparatus through the host port, and the slave sub-circuit receives the output controlling signal through the slave port, and generates a second controlling signal, and (iv) when the slave apparatus is in an abnormal working condition, the slave sub-circuit receives a first feedback signal, and generates a feedback controlling signal that is sent to the host apparatus through the slave port, and the host apparatus receives the feedback controlling signal through the host port, and generates a second feedback signal that regulates the first controlling signal such that the slave apparatus recovers to the normal working condition.

Figure 2A:
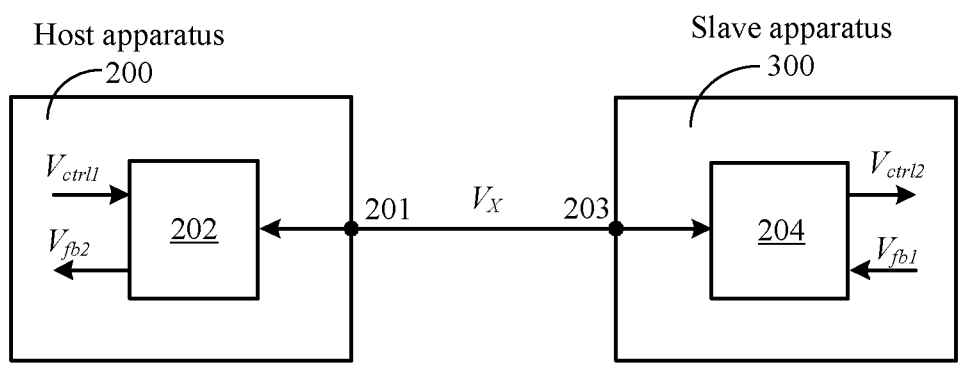
FIG. 2A is a schematic diagram of a first example communication circuit utilizing a single communication line in accordance with embodiments of the present invention.

With reference to FIG. 2A, a schematic diagram of a first example communication circuit utilizing a single communication line is shown in accordance with embodiments of the present invention. The communication can include host apparatus 200 and slave apparatus 300. Host apparatus 200 can include host port 201 and host sub-circuit 202 coupled to host port 201. Slave apparatus 300 can include a slave port 203 and slave sub-circuit 204 coupled to slave port 203. In some configurations, host port 201 may be an output port, while slave port 203 may be an input port. However, each of host port 201 and slave port 203 can be input/output ports such that communication can flow from host apparatus 200 to slave apparatus 300, and vice versa.

When slave apparatus 300 is in a normal working condition, an output controlling signal may be generated and transferred to slave apparatus 300 through the host port 201 by host sub-circuit 202 based on the received first controlling signal $V_{ctrl1}$. Slave sub-circuit 204 may receive the output controlling signal through slave port 203 to generate second controlling signal $V_{ctrl2}$.

When slave apparatus 300 is in an abnormal working condition, a feedback controlling signal may be generated by slave sub-circuit 204 and transferred to host apparatus 200 through slave port 203 based on the received first feedback signal $V_{fb1}$. In addition, second controlling signal $V_{ctrl2}$ may be unavailable. Also, second feedback signal $V_{fb2}$ may be generated by host apparatus 200 based on the received feedback controlling signal through host port 201 to regulate the first controlling signal $V_{ctrl1}$, such that slave apparatus 300 recovers to a normal working condition.

Whether a working condition or mode of operation is detected as "normal" or "abnormal" as described herein, may depend on the particular application and/or circuit configurations involved. For example, an abnormal working condition can include regulator, host apparatus, slave apparatus, and/or power output circuit conditions of at least one of: over-current, over-voltage, over-temperature, and a condition with at least a predetermined difference between an output signal of the power output circuit and a predetermined value.

Figure 2B:
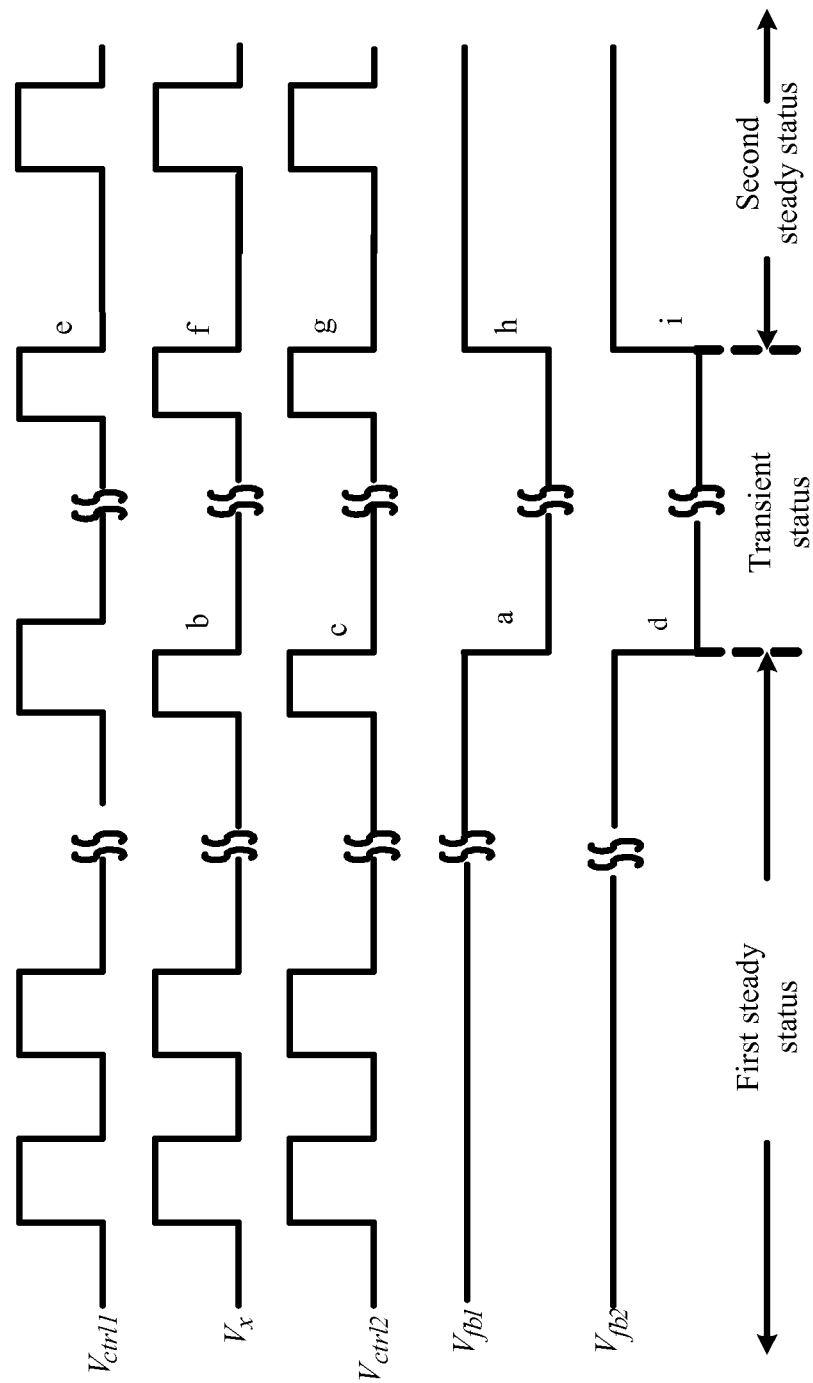
FIG. 2B is an example operation waveform of a communication circuit utilizing a single communication line of FIG. 2A, in accordance with embodiments of the present invention.

With reference to FIG. 2B, example operation waveforms of the communication circuit utilizing a single communication line as shown in FIG. 2A is illustrated. In this example, signal $V_X$ indicates an intermediate signal transferred bi-directionally between host apparatus 200 and slave apparatus 300.

When slave apparatus 300 is detected as being in an abnormal working condition, first feedback signal $V_{fb1}$ may be converted to a low level from a high level (e.g., at time "a") to indicate the abnormal working condition of slave apparatus 300 at this time. Intermediate signal $V_X$ can change from a high level to a low level correspondingly (e.g., at time "b") by operation of slave sub-circuit 204, which can result in the second controlling signal $V_{ctrl2}$ being converted to a low level from a high level (e.g., at time "c"), and second feedback signal $V_{fb2}$ being converted to a low level from a high level (e.g., at time "d").

The communication circuit may also utilize a single communication line to transition into a transient status from a steady-state status. Firstly, the change of intermediate signal $V_X$ can cause first controlling signal $V_{ctrl1}$ to change from a high level to a low level (e.g., at time "e") by operation of host sub-circuit 202. Then, intermediate signal $V_X$ may change from a high level to a low level (e.g., at time "f").

Secondly, second controlling signal $V_{ctrl2}$ may change from a high level to a low level (e.g., at time "g"), and second feedback signal can change from a low level to a high level (e.g., at time "i"). Thirdly, first feedback signal $V_{fb1}$ may change from a low level to a high level (e.g., time "h"), and the communication circuit utilizing a single communication line can recover to a second steady status as shown.

Only one communication port and one corresponding signal processing circuit may be employed for both host apparatus and slave apparatus of the example communication circuit shown in FIG. 2A. The control for slave apparatus 300 by host apparatus 200 and feedback operation for host apparatus 200 by slave apparatus 300 can be achieved by host sub-circuit 202 and slave sub-circuit 204. The implementation of FIG. 2A in accordance with embodiments of the present invention advantageously provides bi-directional communication (e.g., for power output/regulating circuits) utilizing a single communication line between a host apparatus and a slave apparatus, less communication ports, simplified circuit, and lower associated cost.

Figure 3A:
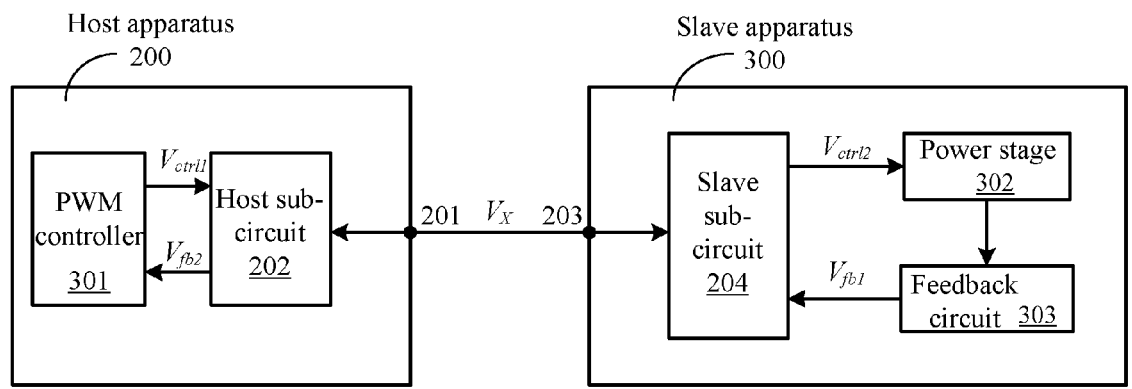
FIG. 3A is a schematic diagram of a second example communication circuit utilizing a single communication line in accordance with embodiments of the present invention.

With reference to FIG. 3A, a schematic diagram of a second example communication circuit utilizing a single communication line in accordance with embodiments the present invention is shown. Here, host apparatus 200 may be employed as a controlling chip, and can include PWM controller 301, host sub-circuit 202, and host port 201, which can be an output pin or an input/output pin or port. Slave apparatus 300 may be employed as a power output circuit, and can include power stage 302, feedback circuit 303, slave sub-circuit 204, and slave port 203 (e.g., an input port or an input/output port).

When the power output circuit 300 is detected as being in a normal working condition, the operation may be as follows. The output of PWM controller 301 may be used as first controlling signal $V_{ctrl1}$, which can be received by host sub-circuit 202 to generate an output controlling signal. The output controlling signal may then be transferred to slave apparatus 300 through host port 201. A second controlling signal may be generated by slave sub-circuit 204 based on the received output controlling signal through slave port 203 to control the power output circuit in a normal working condition.

When the power output circuit is in an abnormal working condition, the operation may be as follows. A feedback signal indicating an output of power stage 302 may be generated by feedback circuit 303, which can be employed as first feedback signal $V_{fb1}$. Also, a feedback controlling signal may be generated by slave sub-circuit 204 based on the received first feedback signal $V_{fb1}$, which may then be transferred to host apparatus 200 through slave port 203.

Second feedback signal $V_{fb2}$ may be generated by host sub-circuit 202 based on the received feedback controlling signal through host port 201, which may then be sent to PWM controller 301 to regulate first controlling signal $V_{ctrl1}$ such that the power output circuit recovers to a normal working condition.

Power stage 302 can be implemented in any suitable topology (e.g., buck, boost, buck-boost, single-ended primary-inductor converter (SEPIC), flyback topology, etc.). In addition, the abnormal working condition can be determined or treated as being related to one or more conditions of over-temperature, over-voltage, over-current, or a difference between the power output circuit and a predetermined value being greater than a predetermined amount. In particular embodiments, other conditions, parameter measurements, and the like, may be defined or selected (e.g., by the user) to define abnormal/normal working conditions as described herein.

Figure 3B:
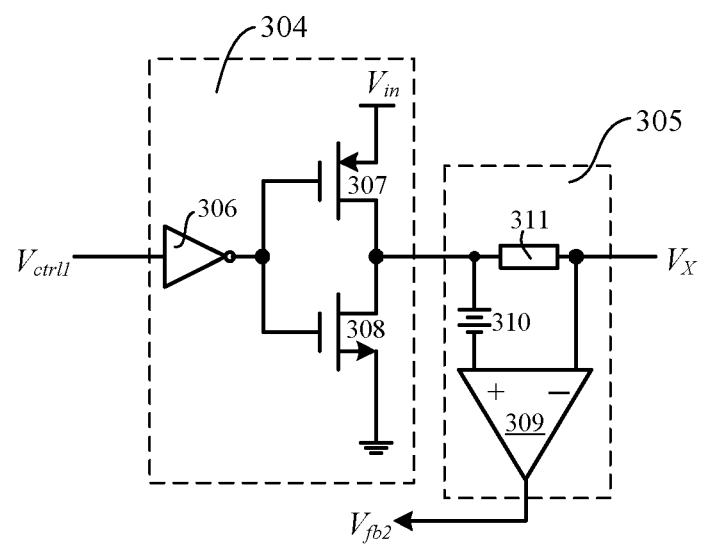
FIG. 3B is a schematic diagram of an example output circuit for the communication circuit utilizing a single communication line shown in FIG. 3A, in accordance with embodiments of the present invention.

With reference to FIG. 3B, shown is a schematic diagram of an example host sub-circuit 202 (see, e.g., FIG. 3A), which can include boosting circuit 304 and common mode amplifying circuit 305. Boosting circuit 304 can include inverter 306, first transistor 307, and second transistor 308. First transistor 307 and second transistor 308 can be connected in series between input voltage $V_{in}$ and ground. A first terminal of first transistor 307 can connect to input voltage $V_{in}$, a second terminal can connect to a first terminal of second transistor 308, and a second terminal of second transistor 308 can be grounded. One terminal of inverter 306 may receive first controlling signal $V_{ctrl1}$, while the other terminal of inverter 306 may connect to the controlling terminals of first transistor 307 and second transistor 308.

Common mode amplifying circuit 305 can include common mode amplifier 309, voltage reference 310, and sensing resistor 311. One terminal of sensing resistor 311 can connect to a common node of the second terminal of first transistor 307 and the first terminal of second transistor 308. The other terminal of sensing resistor 311 can be employed as the intermediate signal (e.g., coupled between host apparatus 200 and slave apparatus 300). The input terminals of common mode amplifier 309 can separately connect to voltage reference 310 and a terminal of sensing resistor 311.

Figure 3C:
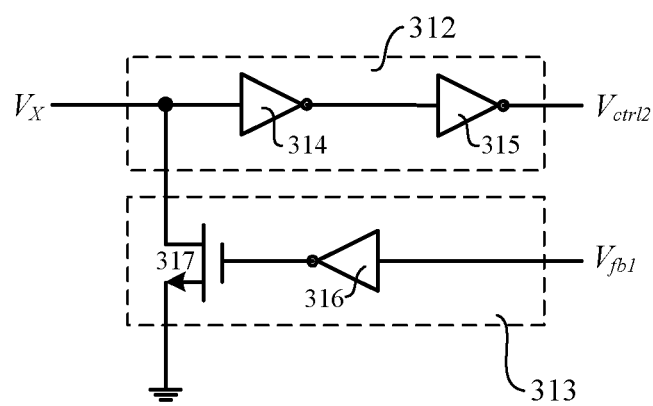
FIG. 3C is a schematic diagram of an example receiving circuit for the communication circuit utilizing a single communication line shown in FIG. 3A, in accordance with embodiments of the present invention.

With reference to FIG. 3C, shown is a schematic diagram of an example slave sub-circuit 204 (see, e.g., FIG. 3A) that can include output branching circuit 312 and feedback branching circuit 313. The output branching circuit 312 can include inverter 314 and inverter 315 coupled in series. The first terminal of output branching circuit 312 may be coupled to feedback branching circuit 313 and configured to receive intermediate signal $V_X$. The output signal of output branching circuit 312 may be employed as second controlling signal $V_{ctrl2}$. Feedback branching circuit 313 can include inverter 316 and third transistor 317. The controlling terminal of third transistor 317 can connect to receive first feedback signal $V_{fb1}$ through inverter 316. Also, one terminal of third transistor 317 can connect to ground, while a second terminal of third transistor 317 can connect to receive intermediate signal $V_X$.

The operation of the example communication circuit that includes the example host sub-circuit and example slave sub-circuit shown as shown in FIG. 3B and FIG. 3C, respectively, may be as follows. When slave apparatus 300 is in a normal working condition, the PWM controlling signal generated by PWM controller 301 may be used as first controlling signal $V_{ctrl1}$, which can then be transferred to inverter 306 and boosted by boosting circuit 304 to output intermediate signal $V_X$ at the output terminal of sensing resistor 311. In this way, the output controlling signal can be transferred to slave port 203 of slave apparatus 300 through host port 201. Second controlling signal $V_{ctrl2}$ may be generated by output branching circuit 312 of slave sub-circuit 204 based on received output controlling signal to control power stage 302 to output an electrical signal.

When slave apparatus 300 is in an abnormal working condition, first feedback signal $V_{fb1}$ may be generated indicating the abnormal working condition by feedback circuit 303, and feedback branching circuit 313 may be activated. First feedback signal $V_{fb1}$ can be inverted by inverter 316 to control the controlling terminal of third transistor 317 to turn on third transistor 317, such that intermediate signal $V_X$ changes correspondingly. By the operation of inverter 314 and inverter 315 of output branch 312, second controlling signal $V_{ctrl2}$ can change correspondingly to regulate the status of power stage 303.

The variation of intermediate signal $V_X$ may bring in the difference between the two input terminals of common mode amplifier 309, thus intermediate signal $V_X$ may not be the same as voltage reference 310. Second feedback signal $V_{fb2}$ can be generated at the output terminal by common mode amplifier 309 in accordance with the difference. First controlling signal $V_{ctrl1}$ may be regulated to a proper value by PWM controller 301 based on the received second feedback signal $V_{fb2}$ such that power stage 302 recovers to a normal working condition.

In one example, a communication method can include: (i) determining if a communication system is in a normal working condition, where the communication system comprises a host apparatus with a host port and a slave apparatus with a slave port, where the host apparatus and the slave apparatus are coupled by the host port and the slave port via a single communication line; (ii) when the communication system is in a normal working condition, converting a first controlling signal to an output controlling signal that is sent to the slave port through the host port; (iii) converting, by the slave apparatus, the output controlling signal to a second controlling signal; (iv) when the communication system is in an abnormal working condition, generating, by the slave apparatus, a first feedback signal indicating the abnormal working condition; (v) converting, by the slave apparatus, the first feedback signal to a feedback controlling signal that is sent to the host port through the slave port; and (vi) generating, by the host apparatus, a second feedback signal for regulating the first controlling signal such that the communication system recovers to the normal working condition.

Figure 4:
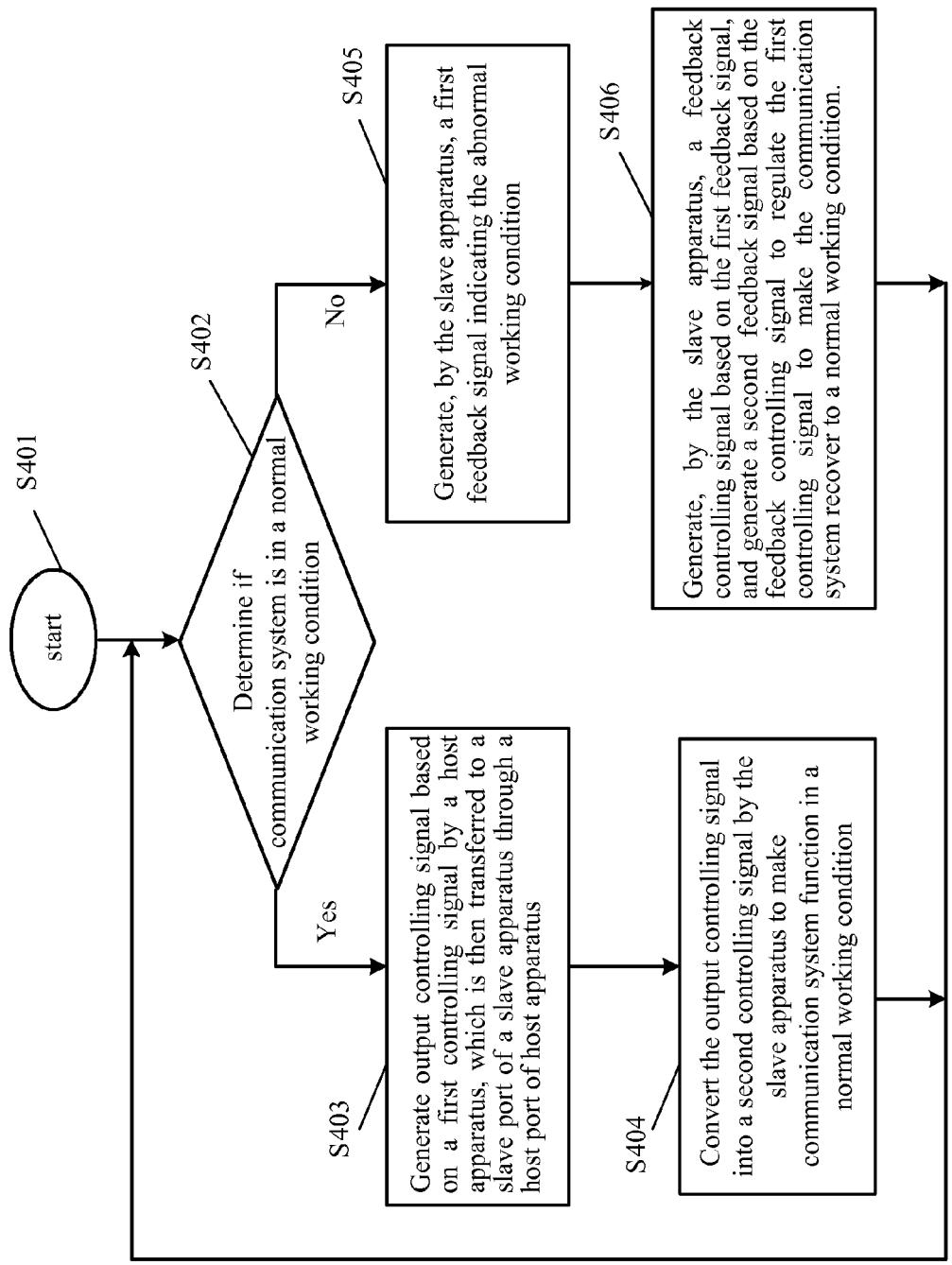
FIG. 4 is a flow chart of a first example communication method utilizing a single communication line, in accordance with embodiments of the present invention.

With reference to FIG. 4, shown is a flow chart of a first example communication method that utilizes a single communication line, in accordance with embodiments of the present invention. For example, the communication system can include a host apparatus and a slave apparatus, as discussed above. The flow begins at S401, and at S402 it may be determined if the communication circuit is operating in a normal working condition.

At S403, if the communication system is in a normal working condition, an output controlling signal may be generated, by the host apparatus, based on a first controlling signal, which is then transferred to a slave port of the slave apparatus through host port of host apparatus. At S404, the output controlling signal may be converted into a second controlling signal by the slave apparatus.

At S405, if the communication system is in an abnormal working condition, a first feedback signal indicating the abnormal working condition may be generated by the slave apparatus. At S406, a feedback controlling signal may be generated, by the slave apparatus, based on the first feedback signal, which may then be transferred to the host port of the host apparatus through the slave port of the slave apparatus. A second feedback signal may be generated based on the feedback controlling signal to regulate the first controlling signal such that the communication system recovers to a normal working condition.

Thus in particular embodiments, only one communication port and one corresponding signal processing circuit are employed for the host apparatus and the slave apparatus. The processing for the first controlling signal and first feedback signal may achieve control from host apparatus to slave apparatus, and feedback control from slave apparatus to host apparatus. Thus, bi-directional communication, reduced communication ports, simplified circuitry, and lower cost may be achieved, e.g., by the implementation shown in FIG. 2A.

Figure 5:
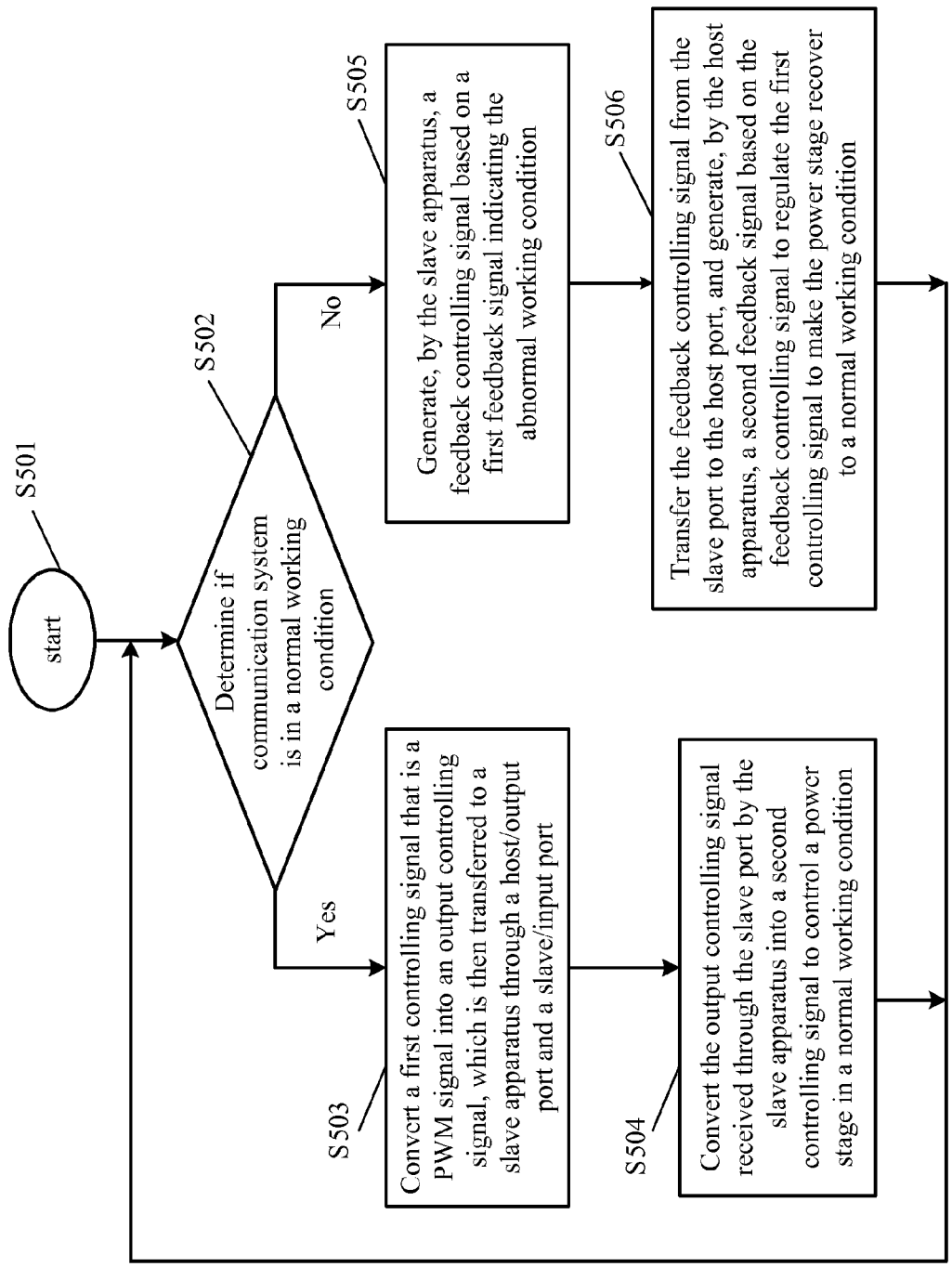
FIG. 5 is a flow chart of a second example communication method utilizing a single communication line, in accordance with embodiments of the present invention.

With reference to FIG. 5, shown is a flow chart of a second example communication method in accordance with embodiments of the present invention. For example, this method can be utilized in a communication system having a host apparatus and a slave apparatus. Also, the slave apparatus can include a power stage that can be one of buck, boost, buck-boost, SEPIC, flyback, or any other suitable topology.

The flow can begin at S501, and at S502 it can be determined if the communication system is in normal working condition. At S503, if the communication system is in a normal working condition, the first controlling signal (that is a PWM signal) may be converted into an output controlling signal, which may then be transferred to the slave apparatus through a host port of the host apparatus. At S504, the output controlling signal received through a slave port can be converted by the slave apparatus into a second controlling signal to control the power stage in a normal working condition.

At S505, if the communication circuit utilizing a single communication line is in an abnormal working condition, a first feedback signal indicating the abnormal working condition may be generated, which may then be converted into feedback controlling signal. At S506, the feedback controlling signal may be transferred from the slave port to the host port. A second feedback signal may be generated, by the host apparatus, based on the feedback controlling signal to regulate the first controlling signal such that power stage recovers to a normal working condition.

As discussed above, an abnormal working condition may be one or more of over-current, over-voltage, over-temperature, or a condition with a difference between output of power output circuit and a predetermined value being greater than a predetermined amount. Of course, one skilled in the art will recognize that other operating abnormalities may be defined, such as those specific to certain applications, topologies, or circuit implementations.

The foregoing descriptions of specific embodiments of the present invention have been presented through images and text for purpose of illustration and description of the start-up circuit and method. They are not intended to be exhaustive or to limit the invention to the precise forms disclosed, and obviously many modifications and variations are possible in light of the above teaching.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A communication circuit, comprising:
    a) a host apparatus configured as a control chip and having a host sub-circuit, a pulse-width modulation (PWM) circuit, and a host port; and
    b) a slave apparatus configured as a power output circuit and having a slave sub-circuit, a power stage circuit, a feedback circuit, and a slave port, wherein said host apparatus and said slave apparatus are coupled by said host port and said slave port via a single communication line, wherein a normal working condition or an abnormal working condition of said slave apparatus is determined based on detecting a condition of said power output circuit;
    c) wherein when said slave apparatus is in said normal working condition, said host sub-circuit is configured to receive a first controlling signal from said PWM circuit, and to generate an output controlling signal that is sent to said slave apparatus through said host port, and said slave sub-circuit is configured to receive said output controlling signal through said slave port, and to generate a second controlling signal for control of said power output circuit to operate in said normal working condition, and
    d) wherein when said slave apparatus is in said abnormal working condition, said feedback circuit is configured to generate a first feedback signal that indicates said abnormal working condition, said slave sub-circuit is configured to receive said first feedback signal, and to provide a feedback controlling signal to said host apparatus through said slave port, and said host apparatus is configured to receive said feedback controlling signal through said host port, and to provide a second feedback signal to said PWM circuit to adjust said first controlling signal such that said power output circuit recovers to said normal working condition.

2. The communication circuit of claim 1, wherein said first feedback signal indicates an output signal of said power stage circuit.

3. The communication circuit of claim 1, wherein said power stage circuit comprises a topology selected from buck, boost, buck-boost, flyback, and single-ended primary-inductor converter (SEPIC).

4. The communication circuit of claim 1, wherein said abnormal working condition comprises at least one of conditions of: over-current, over-voltage, over-temperature, and a condition with at least a predetermined difference between an output signal of said power output circuit and a predetermined value.

5. The communication circuit of claim 1, wherein said host sub-circuit comprises:
    a) a boosting circuit coupled to said PWM circuit, said boosting circuit being configured to generate said output controlling signal by boosting said first controlling signal; and
    b) an amplifier configured to generate said second feedback signal in response to said feedback controlling signal and a voltage reference.

6. The communication circuit of claim 5, wherein said boosting circuit comprises:
    a) an inverter configured to receive said first controlling signal;
    b) a first transistor controllable by an output of said inverter; and
    c) a second transistor controllable by said output of said inverter.

7. The communication circuit of claim 6, further comprising a sensing resistor coupled to said amplifier and said first and second transistors.

8. The communication circuit of claim 1, wherein said slave sub-circuit comprises:
    a) an output branching circuit having first and second inverters coupled in series, wherein a first terminal of said output branching circuit is configured to receive said output controlling signal, and a second terminal of said output branching circuit is coupled to said power stage; and
    b) a feedback branching circuit having a third inverter and a transistor, wherein a first terminal of said transistor is coupled to receive said first feedback signal through said third inverter, a second terminal of said transistor is grounded, and a third terminal of said transistor is configured as said feedback controlling signal.

9. The communication circuit of claim 1, wherein said power output circuit is configured to output a regulated voltage.

10. The communication circuit of claim 1, wherein said condition is configured to be selected by a user.

11. The communication circuit of claim 1, wherein said condition is predefined by a user.

12. A method of communicating via a single communication line, the method comprising:
    a) determining if a power output circuit of a slave apparatus is in a normal working condition, said slave apparatus being configured as said power output circuit and having slave sub-circuit, a power stage circuit, a feedback circuit, and a slave port, wherein a host apparatus is configured as a control chip and having a host sub-circuit, a pulse-width modulation (PWM) circuit, and a host port, wherein said host apparatus and said slave apparatus are coupled by said host port and said slave port via said single communication line;

b) when said power output circuit is in said normal working condition, converting a first controlling signal from said PWM circuit to an output controlling signal that is sent to said slave port through said host port;

c) when said power output circuit is in said normal working condition, converting, by said slave apparatus, said output controlling signal to a second controlling signal for controlling said power output circuit to operate in said normal working condition;

d) when said power output circuit is in an abnormal working condition, generating, by said feedback circuit, a first feedback signal indicating said abnormal working condition;

e) when said power output circuit is in said abnormal working condition, converting, by said slave sub-circuit, said first feedback signal to a feedback controlling signal that is sent to said host port through said slave port; and f) when said power output circuit is in said abnormal working condition, providing, by said host apparatus, a second feedback signal to said PWM circuit for adjusting said first controlling signal such that said power output circuit recovers to said normal working condition.

13. The method of claim 12, wherein said second controlling signal controls said power output circuit in said normal working condition.

14. The method of claim 12, wherein said power stage circuit comprises a topology selected from buck, boost, buck-boost, flyback, and single-ended primary-inductor converter (SEPIC).

15. The method of claim 12, wherein said abnormal working condition comprises at least one of conditions of: over-current, over-voltage, over-temperature, and a condition with at least a predetermined difference between an output signal of said power output circuit and a predetermined value.

16. The method of claim 12, further comprising regulating a voltage by said power output circuit.

17. The method of claim 12, further comprising receiving a selection of said condition by a user.

18. The method of claim 12, further comprising predefining said condition.

* * * * *